United States Patent [19]

Marinus et al.

[11] Patent Number: 4,945,465
[45] Date of Patent: Jul. 31, 1990

[54] SWITCHED-MODE POWER SUPPLY CIRCUIT

[75] Inventors: Antonius A. M. Marinus; Hubertus C. Miermans; Guy L. P. De Bondt, all of Eindhoven, Netherlands

[73] Assignee: U.S. Philips Corporation, New York, N.Y.

[21] Appl. No.: 398,124

[22] Filed: Aug. 24, 1989

[30] Foreign Application Priority Data

Sep. 15, 1988 [NL] Netherlands .................. 8802267

[51] Int. Cl.$^5$ ........................................ H02M 3/335
[52] U.S. Cl. ........................................ 363/89; 363/21; 363/97; 323/267
[58] Field of Search .............. 363/20, 21, 86, 89, 363/97; 323/267

[56] References Cited

U.S. PATENT DOCUMENTS

| | | | |
|---|---|---|---|
| 4,642,743 | 2/1987 | Radcliffe | 363/21 |
| 4,642,744 | 2/1987 | Thomas | 363/21 |
| 4,694,385 | 9/1987 | Marinus | 363/19 |
| 4,833,582 | 5/1989 | Kupka | 363/21 |
| 4,847,742 | 7/1989 | Ohashi et al. | 363/21 |

FOREIGN PATENT DOCUMENTS 2542522 9/1984 France .

*Primary Examiner*—Peter S. Wong
*Attorney, Agent, or Firm*—Edward W. Goodman

[57] ABSTRACT

A switched-mode power supply circuit having a transformer and a first controllable switch on the primary side of the transformer. A first section is in the form of a flyback d.c. converter including a first secondary winding of the transformer for generating a first d.c. output voltage which is stabilized, by a control, against d.c. input voltage variations of the circuit and of a first load. A second section including a second secondary winding of the transformer constitutes a forward d.c. converter having a second controllable switch for generating a second d.c. output voltage. The ratio between the period of conductance of the second switch and the period of the control signal of the first switch is independent of the frequency of this signal.

8 Claims, 2 Drawing Sheets

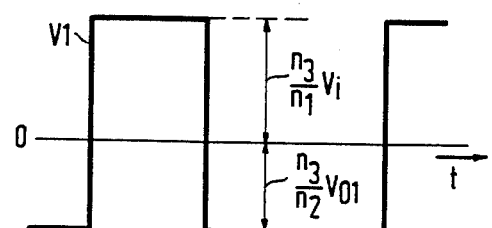
FIG. 2a
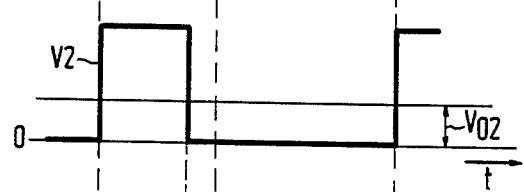
FIG. 2b
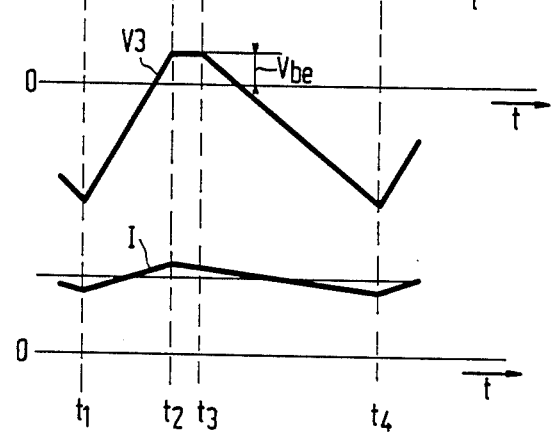
FIG. 2c
FIG. 2d
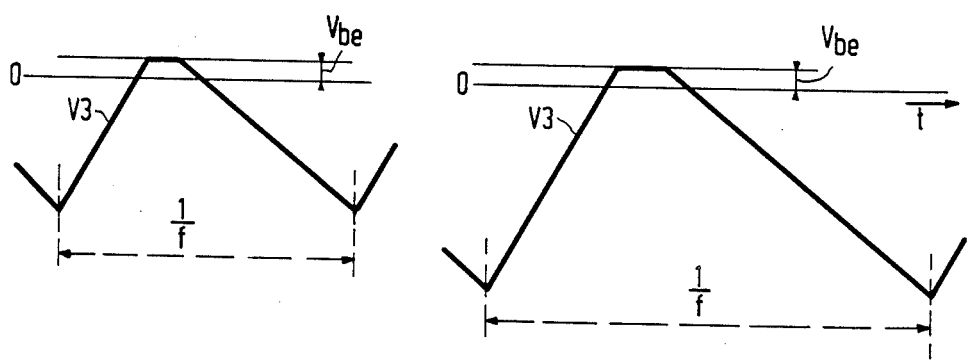
FIG. 3

SWITCHED-MODE POWER SUPPLY CIRCUIT

BACKGROUND OF THE INVENTION

1. Field of the Invention

The invention relates to a switched-mode power supply circuit comprising a transformer having a primary winding which is arranged in series with a first controllable switch, the series arrangement formed being coupled between the terminals of a d.c. input voltage, the transformer having a first secondary winding to which a rectifier is coupled for making a first d.c. output voltage available and a second secondary winding to which a second controllable switch is coupled for making a second d.c. output voltage available, the circuit further comprising first control means for applying a periodical control signal to the first switch for rendering said switch alternately conducting and non-conducting in dependence upon the first output voltage, as well as second control means for rendering the second switch alternately conducting and non-conducting, the rectifier being conducting when the first switch is blocked and the interval of conductance of the second switch being located in the interval of conductance of the first switch.

A power supply circuit of this type is known from German Patent Application 2,608,167. In this known circuit the first output voltage is maintained substantially constant in spite of possible variations of the input voltage and/or of a load connected to the first output voltage because the intervals of conductance of the first controllable switch are controlled as a function of the first output voltage, and the second output voltage is maintained substantially constant because the intervals of conductance of the second controllable switch are controlled as a function of the second output voltage.

SUMMARY OF THE INVENTION

It is an object of the invention to provide a power supply circuit of the type described above in which the second output voltage remains substantially constant when the frequency of the voltage across the second secondary winding varies. To this end the circuit according to the invention is characterized in that the second control means are implemented for a ratio between the period of conductance of the second switch and the period of the control signal of the first switch, this ratio being independent of the frequency of said signal.

The invention is based on the recognition that the second output voltage is substantially constant when the frequency of the voltage across the second secondary winding varies as a result of variations in the first section of the circuit, more specifically due to the frequency independence of the above-mentioned ratio (the so-called "duty cycle"). Consequently, a variation of the load of the first output voltage does not have any influence on the second output voltage.

The circuit is preferably characterized in that the second control means comprise an integrator coupled to the second secondary winding, the signal at an output of the integrator being sawtooth-shaped and having a first edge with a given variation direction during the interval of conductance of the second switch and a second edge with the opposite variation direction during the blocking interval of the first switch. This measure is based on the recognition that due to the integration, the second edge of the sawtooth-shaped signal comprises information about the frequency of the switching signal in the sense that a variation of the period of this signal causes a corresponding variation of the blocking period of the second switch. This variation can be converted into a variation of the duty cycle. This is a forward control of the duty cycle as a function of the voltage across the second secondary winding.

A circuit comprising a comparison stage, a first input of which is coupled to an output terminal of the circuit, a second input is connected to a reference value, and an output is coupled to the output of the integrator for comparing the second output voltage with the reference value and for generating a control signal for maintaining the second output voltage constant, may advantageously be characterized by an element for superimposing the control signal on the sawtooth-shaped signal of the integrator. This is a backward control whose control signal is superimposed on that of the forward control.

BRIEF DESCRIPTION OF THE DRAWINGS

The invention will be described in greater detail by way of example with reference to the accompaying drawings, in which:

FIGS. 2a to 2d show waveforms occurring therein in the circuit of FIG. 1; and

FIGS. 3a and 3b show the variation of a waveform of FIG. 2 with a variation of the frequency.

DESCRIPTION OF THE PREFERRED EMBODIMENT

Figure 1:
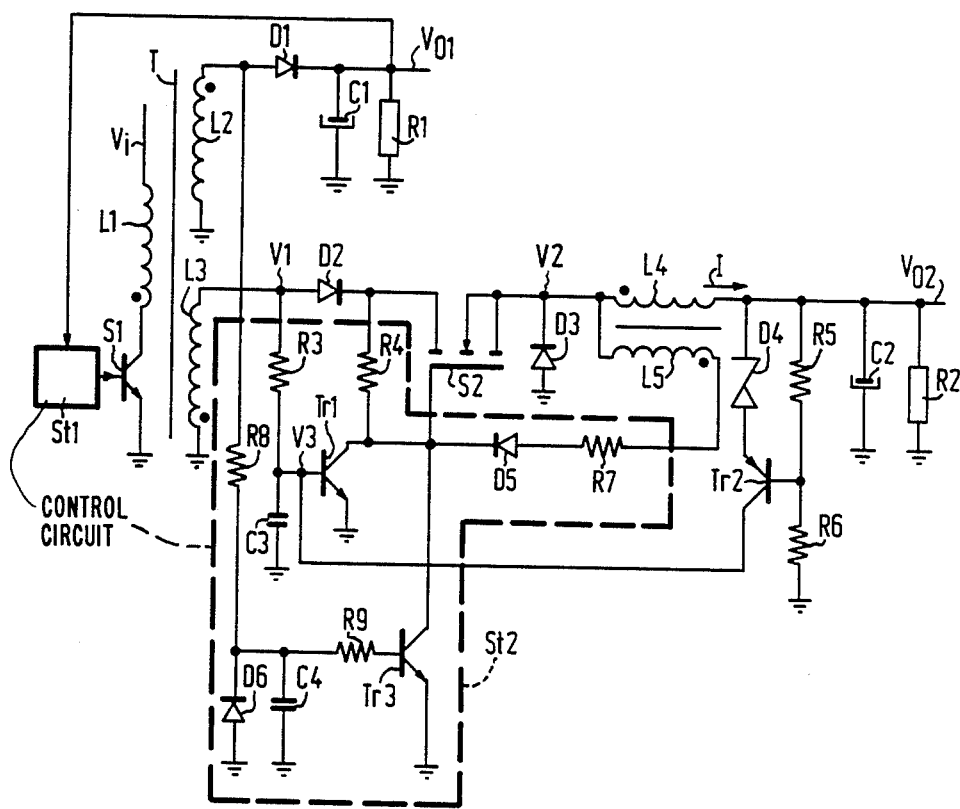
FIG. 1 is a basic circuit diagram of the circuit according to the invention.

The power supply circuit of FIG. 1 comprises a controllable power switch S1 in the form of an npn switching transistor whose collector is connected to the primary winding L1 of a transformer T and whose emitter is connected to ground. At the other end, winding L1 is connected to the positive rail of a d.c. input voltage $V_i$ whose negative rail is also connected to ground and which is, for example, a line voltage rectifier. The base lead of transistor S1 incorporates control a means circuit St1 for turning the transistor alternately on and off.

Transformer T has a plurality of secondary windings. One of these windings, L2, has an end which is connected to ground. The anode of a rectifier D1 is connected to the other end of winding L2 and its cathode is connected to a smoothing capacitor C1 and to a load represented by a resistor R1. The terminals of capacitor C1 and resistor R1 not connected to rectifier D1 are connected to ground. The winding sense of windings L1 and L2, conventionally indicated by means of dots, and the conductivity direction of rectifier D1 are chosen to be such that, in operation, a current flows through the one winding while the other is currentless. A d.c. output voltage $V_{o1}$ is present across load R1. This voltage is fed back to the control circuit St1 of transistor S1 for controlling the periods of conductance of this transistor. In this known manner voltage, $V_{o1}$ is maintained substantially constant in spite of possible variations of voltage $V_i$ and/or of load R1. As a result the frequency of the switching signal applied by control circuit St1 to the base of transistor S1 varies, for example because the blocking period of the transistor is constant or because the circuit of FIG. 1 is self-oscillating. In the latter case, transformer T has a positive feedback winding (not shown) for controlling the base of transistor S1. Such a self-oscillating power supply circuit is known, for example from Netherlands Patent Application 8502339 corresponding to U.S. Pat. No. 4,694,385, (PHN 11.470) in the name of the Applicant. The text of this Application is considered to be incorporated herein by reference. The circuit of FIG. 1 may be, for example a supply circuit for a television receiver. Transformer T has a plurality of secondary windings whose loads are constituted by the consumption of a plurality of circuits in the receiver including a line deflection circuit and sound stages so that the resistor R1 in FIG. 1, and hence the frequency of oscillation, may vary quite considerably.

A second secondary winding L3 of transformer T is connected to ground at one end and at the other end it is connected to the cathode of a diode D2 whose anode is connected to an electrode of a second controllable switch S2. In the embodiment this switch S2 is formed by means of a field-effect transistor and the electrode connected to diode D2 is its drain. The source of transistor S2 is connected to the cathode of a diode D3 the anode of which is connected to ground and the source of transistor S2 is connected to one end of an inductance L4, the other end of which is connected to a smoothing capacitor C2 which has its other terminal connected to ground. A second load R2 which is also represented by a resistor is arranged parallel to capacitor C2. The winding sense of winding L3 and the conductivity direction of diode D2 are chosen to be such that, in operation, a current can flow through these elements in the same time interval when current flows through transistor S1 and winding L1, while winding L2 and diode D1 are currentless. A second d.c. output voltage $V_{o2}$ is present across load R2.

Control circuit St2 for the control of transistor S2 is connected to the gate of this transistor. The circuit St2 comprises an integrator constituted by the series arrangement of a resistor R3 and a capacitor C3, this integrator being connected between the junction point of winding L3 with diode D2 and ground, and a transistor Tr1. The base of transistor Tr1 is connected to the junction point of resistor R3 and capacitor C3 and the emitter is connected to ground. A resistor R4 is connected between the collector of transistor Tr1 and the junction point between the cathode of diode D2 and the drain of transistor S2. The gate of transistor S2 and the collector of transistor Tr1 are connected to each other. Inductance L4 is formed as the primary winding of a transformer, a secondary winding L5 of which has an end connected to the junction point of diode D3 and inductance L4. The other end of winding L5 is connected to the gate of transistors S2 via the series arrangement of a limiting resistor R7 and an isolating diode D5.

FIG. 2a shows the variation as a function of time of the voltage V1 across winding L3, FIG. 2b shows the variation of the voltage V2 at the junction point of elements S2, D3 and L4, FIG. 2c shows the variation of the voltage V3 across capacitor C3, and FIG. 2d shows the variation of the current I through inductance L4. At an instant $t_1$ transistor S1 is turned on. A current flows through winding L1 and it also flows through the transistor S1. The voltage at the collector is substantially zero. No current flows through winding L2 and a current flows through winding L3 which finds itself a path through diode D2 and transistor S2. This transistor S2 is turned on via resistor R4 and is kept turned on by means of the take-over winding L5. The winding sense of windings L4 and L5 and the conductivity direction of diode D5 are such that the positive portions of voltage V2 are passed on to the gate. Due to this measure the switching properties of the field-effect transistor S22 are improved and the dissipation therein is reduced. After instant $t_1$, transistor Tr1 is initially turned off. Voltage V1 is equal to $(n_3/n_1)V_i$, in which $n_1$ and $n_3$ is the number of turns of windings L1 and L3, respectively. The difference between voltages V1 and V2 is equal to the voltage drop across diode D2 and transistor S2. A charge current flows through resistor R3 to capacitor C3, so that voltage V3, which is the integral of voltage V1, increases as a substantially linear function of time with a slope which is approximately proportional to the afore-given value of voltage V1.

At an instant $t_2$, voltage V3 reaches the value $V_{be}$ of the base-emitter threshold voltage of transistor Tr1 so that this transistor is turned on. A current now flows through winding L3 via resistor R3 to the base of transistor Tr1 and a current flows to the collector via resistor R4. The voltage at the collector becomes substantially zero so that transistor S2 is turned off. Due to the energy stored in inductance L4, the current I flowing therethrough, which was an increasing, substantially linear function of time from instant $t_1$, continues to flow in the same direction but now through diode D3 in accordance with a decreasing, substantially linear function of time. Voltage V2 is substantially zero. At an instant $t_3$ transistor S1 is turned off. The current through winding L1, on the one hand, and the current through winding L3 and diode D2, on the other hand, stop, while the energy stored in transformer T produces a current through winding L2, this current finding a path through rectifier D1. The voltage at its anode, i.e. the peak value of the square-wave voltage across winding L2, is substantially equal to $V_{o1}$. Voltage V1 is inverted and is substantially equal to $-(n_3/n_2)V_{o1}$ in which $n_2$ is the number of turns of winding L2. Voltage V3, which was clamped at the value $V_{be}$ between instants $t_2$ and $t_3$, now decreases because capacitor C3 is being discharged. The discharge current flows through resistor R3 and winding L3. Voltage V3 varies as the integral of this current and decreases as a substantially linear function of time, the slope being approximately proportional to the afore-given value of voltage V1.

The situation described is maintained until transistor S1 is turned on again at an instant $t_4$. Instant $t_4$ corresponds to instant $t_1$ and the interval between these instants is equal to one period of the switching signal applied to transistor S1. Until instant $t_4$, current I continues to flow in the way already mentioned. Inductance L4 has such a value that current I does not become zero. The a.c. component across capacitor C2 has a comparatively small amplitude so that large currents to load R2 are possible and capacitor C2 can be given a small capacitance.

It appears from the foregoing that the circuit comprising the elements S1, L1, L2, D1 and C1 constitutes a d.c. converter of the parallel type ("flyback d.c. converter") with an output voltage $V_{o1}$ being a given known function of the input voltage $V_i$ of the converter and that the circuit comprising elements L3, D2, S2, D3, L4 and C2 constitutes a d.c. converter of the series type ("forward" or "down d.c. converter") with an output voltage $V_{o2}$ being the average value of the input voltage of the converter, i.e. the square-wave voltage V2 which is available across winding L3. Since current flows through winding L3 in a time interval in which current also flows through winding L1, the energy going to the second output of the circuit is not stored in transformer T, which is in contrast with the energy going to the first output. As a result the dimensions and also the losses of the transformer can be maintained comparatively small. For example, load R2 is formed by the consumption of digital circuits in the previously mentioned television receiver, which are circuits requiring large supply currents at low voltages. Due to the control of the frequency of the switching signal, the turn-on instant $t_1$ and the turn-off instant $t_3$ of transistor S1 are determined for stabilizing voltage $V_{o1}$. The turn-off instant $t_2$ of transistor S2, whose turn-on instant substantially coincides with that of transistor S1, is always located before the turn-off instant $t_3$ of transistor S1 or it coincides with this instant. The parallel converter thus determines the maximum period of conductance of transistor S2.

If voltage $V_i$ is assumed to be constant in the first instance, the control being only used to eliminate the influence of variations of load R1 on the value of voltage $V_{o1}$, the two slopes of voltage V3 are substantially constant. In FIG. 3 this voltage is plotted as a function of time for two different values of the frequency f of the switching signal. The figures obtained are identical in shape. At the lower value of these frequencies (at the right in FIG. 3), hence at a longer period, the amplitude of voltage V3 is larger and the maximum negative value of voltage V3 is higher. The durations of the interval in which transistor S2 is conductive are in the same ratio as the periods. Consequently the values of the ratio of the period of conductance $t_2-t_1$ of transistor S2 and the period $t_4-t_1$ (the so-called "duty cycle") are equal, i.e. they are independent of the period and hence of the frequency of the switching signal. Since voltage $V_{o2}$ only depends on the value of voltage $V_i$ and on this ratio, voltage $V_{o2}$ is constant.

If the input voltage $V_i$ varies, the slope of the falling edge of voltage V3 does not vary due to the fact that voltage $V_{o1}$ is constant, but the slope of the rising edge does vary, which results in voltage V3 reaching the value $V_{be}$ at an instant which depends on the value of voltage $V_i$. Under these circumstances the period of conductance of transistor S2 is not constant but is dependent on the value of voltage $V_i$. If, for example voltage $V_i$ increases, voltage $V_{o2}$ and also the slope of the left edge in FIG. 2c increase so that the instant $t_2$ will come earlier. This involves a smaller duty cycle and hence a lower value for voltage $V_{o2}$. This control, which is a forward control, thus has a compensating effect. The duty cycle is not constant now, but is still independent of the frequency.

In the circuit described, the base-emitter diode of transistor Tr1 operates as a threshold detector with a reference voltage, which is the threshold voltage of the diode, for turning off transistor S2 when this reference is reached by the sawtooth-shaped voltage V3 which is present across capacitor C3. It will be evident that the threshold detector can be formed in a different way. Due to the control the effect on voltage $V_{o2}$ of frequency variations of voltage V1 as a result of variations of load R1 is substantially eliminated. The effect of a variation of load R2 can also be substantially eliminated, more specifically by means of a second control. For this purpose, the circuit comprises a pnp transistor Tr2 whose base is connected to the junction point of two resistors R5 and R6 which are arranged in series between voltage $V_{o2}$ and ground and which constitute a voltage divider. The emitter is connected to the base of transistor Tr1 via a Zener diode D4 conveying voltage $V_{o2}$ and the collector of transistor Tr2. Transistor Tr2 constitutes a comparison stage for comparing voltage $V_{o2}$ with a reference value and for generating a control current, i.e. the collector current of the transistor which recharges capacitor C3. Consequently voltage V3 also depends on voltage $V_{o2}$, with the result that the turn-on instant of transistor Tr1 and hence the turn-off instant of transistor S2 depend on voltage $V_{o2}$. In a different manner, a direct voltage dependent on voltage $V_{o2}$ can be added to voltage V3. If for some reason or other voltage $V_{o2}$ increases, voltage V3 increases in both cases so that the period of conductance of transistor S2 becomes shorter, which counteracts the increase of voltage $V_{o2}$. This second control is a backward control whose control signal is superimposed on that of the forward control.

The control circuit St2 of transistor S2 further comprise an npn transistor Tr3 whose collector is connected to the gate of transistor S2. Two resistors R8 and R9 are arranged in series between the base of transistor Tr3 and the junction point of winding L2 and rectifier D1. A capacitor C4 and the cathode of a clamping diode D6 are connected to the junction point of these resistors. The anode of diode D6, the other terminal of capacitor C4 and the emitter of transistor Tr3 are connected to ground. Transistor Tr3 is turned on when the voltage across winding L2 becomes positive, i.e. at instant $t_3$. Since transistor S2 is already turned off at that instant, this has no influence on the operation of the circuit. The time constant in the base lead of transistor Tr3 is chosen to be such that this transistor is turned off for a short time, more specifically for approximately 0.5 $\mu$s, after instant $t_4$. Due to this measure transistor S2 is not immediately turned on at the same instant as transistor S1, but a short time later, i.e. at an instant when the collector voltage of this transistor is low, which reduces the turn-on losses of the transistor.

We claim:

1. A switched-mode power supply circuit comprising a transformer having a primary winding which is arranged in series with a first controllable switch, the series arrangement formed being coupled between the terminals of a d.c. input voltage, the transformer having a first secondary winding to which a rectifier is coupled for making a first d.c. output voltage available and a second secondary winding to which a second controllable switch is coupled for making a second d.c. output voltage available, the circuit further comprising first control means for applying a periodical control signal to the first switch for rendering said switch alternately conducting and non-conducting in dependence upon the first output voltage, as well as second control means for rendering the second switch alternately conducting and non-conducting, the rectifier being conducting when the first switch is blocked and the interval of conductance of the second switch being located in the interval of conductance of the first switch, characterized in that the second control means are implemented for a ratio between the period of conductance of the second switch and the period of the control signal of the first switch, said ratio being independent of the frequency of said signal.

2. A circuit as claimed in claim 1, characterized in that the second control means comprise an integrator coupled to the second secondary winding, the signal at an output of the integrator being sawtooth-shaped and having a first edge with a given variation direction during the interval of conductance on the second switch and a second edge with the opposite variation direction during the blocking interval of the first switch.

3. A circuit as claimed in claim 2, characterized in that the second control means comprise a threshold detector connected at one end to the output of the integrator and at the other end to a control electrode of the second switch for switching off said switch when a predetermined reference value is reached by the sawtooth-shaped signal generated by the integrator.

4. A circuit as claimed in claim 3, characterized in that the threshold detector is formed with a transistor whose base is connected to the output of the integrator and whose collector is connected to the control electrode of the second switch, said transistor being turned on when the base-emitter threshold voltage of the transistor is reached by the first edge of the sawtooth-shaped voltage generated by the integrator for switching off the second switch.

5. A circuit as claimed in claim 2, comprising a comparison stage a first input of which is coupled to an output terminal of the circuit, a second input is connected to a reference value and an output is coupled to the output of the integrator for comparing the second output voltage with the reference value and for generating a control signal for maintaining the second output voltage constant, characterized by an element for superimposing the control signal on the sawtooth-shaped signal of the integrator.

6. A circuit as claimed in claim 5, characterized in that the integrator is a bidirectionally active integrator for integrating the voltage across the second secondary winding and said control signal.

7. A circuit as claimed in claim 1, characterized in that the second control means comprise a delay circuit for switching on the second switch after the switch-on instant of the first switch.

8. A circuit as claimed in claim 1, in which an inductive element is coupled between the second switch and a terminal of the second output voltage, characterized in that a take-over winding is coupled to the inductive element, said take-over winding being connected to a control electrode of the second switch.

* * * * *